(12) United States Patent
Horibata

(10) Patent No.: US 8,059,075 B2
(45) Date of Patent: Nov. 15, 2011

(54) LIQUID CRYSTAL DISPLAY DEVICE AND POWER SUPPLY CIRCUIT

(75) Inventor: Hiroyuki Horibata, Gifu (JP)

(73) Assignee: Sony Corporation, Tokyo (JP)

( * ) Notice: Subject to any disclaimer, the term of this patent is extended or adjusted under 35 U.S.C. 154(b) by 1082 days.

(21) Appl. No.: 11/863,584

(22) Filed: Sep. 28, 2007

(65) Prior Publication Data

US 2008/0084515 A1    Apr. 10, 2008

(30) Foreign Application Priority Data

Oct. 10, 2006  (JP) ................................ 2006-275992
Feb. 16, 2007  (JP) ................................ 2007-035740
Jul. 3, 2007   (JP) ................................ 2007-175207

(51) Int. Cl.
  *G09G 3/36* (2006.01)
(52) U.S. Cl. .......................................... 345/87; 345/92
(58) Field of Classification Search ............ 345/87–102, 345/204, 211
  See application file for complete search history.

(56) References Cited

U.S. PATENT DOCUMENTS

| | | | |
|---|---|---|---|
| 6,331,846 B1 | 12/2001 | Nakao | |
| 6,677,925 B1 | 1/2004 | Kawaguchi et al. | |
| 6,995,741 B2 * | 2/2006 | Ishiyama | 345/100 |
| 7,515,132 B2 * | 4/2009 | Kim et al. | 345/98 |
| 2004/0145583 A1 * | 7/2004 | Morita | 345/211 |
| 2006/0158413 A1 * | 7/2006 | Morita | 345/94 |
| 2008/0231641 A1 | 9/2008 | Miyashita | |

FOREIGN PATENT DOCUMENTS

| | | |
|---|---|---|
| JP | 06-327236 | 11/1991 |
| JP | 11-305735 | 11/1999 |
| JP | 2001-147420 | 5/2001 |
| JP | 2002-299559 | 10/2002 |
| JP | 2004-146082 | 5/2004 |
| WO | WO-2006/013538 | 2/2006 |
| WO | WO-2007/029381 | 3/2007 |

* cited by examiner

*Primary Examiner* — Nitin Patel
(74) *Attorney, Agent, or Firm* — K&L Gates LLP

(57) ABSTRACT

A size of a power supply circuit in a liquid crystal display device is reduced while an efficiency of the circuit is improved. The power supply circuit is formed on a TFT substrate of a liquid crystal panel and its output is provided to a vertical drive circuit. The power supply circuit is composed of a DC-DC converter that generates a positive power supply electric potential and a DC-DC converter that generates a negative power supply electric potential. The DC-DC converters are driven by a common electrode signal VCOM. The DC-DC converter that generates the positive power supply electric potential outputs VCOMH×2, and the DC-DC converter that generates the negative power supply electric potential outputs VCOMH×(−1). Thus electric potentials which are suitable to turn pixel transistors on and off are made available.

4 Claims, 11 Drawing Sheets

LIQUID CRYSTAL DISPLAY DEVICE AND POWER SUPPLY CIRCUIT

CROSS-REFERENCE OF THE INVENTION

This application claims priority from Japanese Patent Application Nos. 2006-275992, 2007-035740 and 2007-175207, the contents of which are incorporated herein by reference in their entirety.

BACKGROUND OF THE INVENTION

1. Field of the Invention

This invention relates to a liquid crystal display device, specifically to a liquid crystal display device provide with a power supply circuit that generates a power supply electric potential to control turning on/off of pixel transistors.

2. Description of the Related Art

In an active matrix type liquid crystal display device that is manufactured by a low temperature polysilicon TFT (Thin Film Transistor) technology, a power supply circuit that generates an electric potential to control turning on/off of pixel TFTs has been formed on a TFT substrate of a liquid crystal panel in order to reduce a cost of a driver IC (Integrated Circuit). In general, the power supply circuit is composed of a charge-pump type DC-DC converter, in which a horizontal transfer clock used in a horizontal shift register or a vertical transfer clock used in a vertical shift register in the liquid crystal panel is used as its drive signal.

This kind of active matrix type liquid crystal display device is disclosed in Japanese Patent Application Publication No. 2004-146082.

However, there is a problem that a size of the power supply circuit is large, since amplitude of the horizontal transfer clock and the vertical transfer clock is generally as small as about 3V, and thus +3 times boosting and −2 times boosting are required to obtain high enough power supply voltages to turn the pixel TFTs on and off.

Also, when the horizontal transfer clock or the vertical transfer clock is used as the signal to drive the power supply circuit, there are problems that more area is required by the power supply circuit and that efficiency of the power supply circuit is reduced, since a buffer circuit disposed on the TFT substrate is required to reinforce a low driving capability of an amplifier that outputs the horizontal transfer clock or the vertical transfer clock.

In addition, when the horizontal clock is frequency-divided and resulting frequency-divided clock is used as the drive signal of the power supply circuit, the display may be adversely affected depending on inversion timing of the frequency-divided clock.

Furthermore, when the horizontal transfer clock or the vertical transfer clock is used, an area of a frame region of the liquid crystal panel is increased because a long wiring extending over a glass substrate is often required to deliver the clock to the power supply circuit. When a COG (Chip on Glass) is mounted on the glass substrate, there are cases where forming the wiring is not possible because of restrictions on a layout of the wiring. Also, when a dedicated clock from the driver IC is used as the drive signal of the power supply circuit, there is a problem that the number of terminals on the liquid crystal panel is increased.

SUMMARY OF THE INVENTION

This invention is directed to solve the problems addressed above, and offers a liquid crystal display device having a switching device, a pixel electrode to which a video signal is applied through the switching device, a common electrode to which a common electrode signal that alternates between a high level and a low level is applied, a liquid crystal aligned by an electric field between the pixel electrode and the common electrode, and a power supply circuit that generates a power supply electric potential to control turning on/off of the switching device, the power supply circuit having first and second charge transfer devices connected in series and complimentarily turning on and off in response to the common electrode signal and a first capacitor having one terminal connected with a connecting node between the first and second charge transfer devices and another terminal to which the common electrode signal is applied.

This invention also offers a liquid crystal display device having a first substrate, a switching device formed on the first substrate, a pixel electrode to which a video signal is applied through the switching device formed on the first substrate, a second substrate disposed to face the first substrate, a common electrode formed on the second substrate, to which a common electrode signal that alternates between a high level and a low level is applied, a liquid crystal aligned by an electric field between the pixel electrode and the common electrode, and a power supply circuit that generates a power supply electric potential to control turning on/off of the switching device, the power supply circuit having first and second charge transfer devices formed on the first substrate and connected in series, a capacitor having a first terminal and a second terminal, the first terminal being connected with a connecting node between the first and second charge transfer devices, a buffer circuit formed on the first substrate and having an output terminal connected with the second terminal of the capacitor and an input capacitor formed between an input terminal of the buffer circuit and the common electrode that faces the input terminal.

This invention also offers a power supply circuit having first and second charge transfer devices connected in series, a capacitor having a first terminal and a second terminal, the first terminal being connected with a connecting node between the first and second charge transfer devices, a buffer circuit having an output terminal connected with the second terminal of the capacitor and an input capacitor having a third terminal and a fourth terminal, the third terminal being connected with an input terminal of the buffer circuit and a clock signal being applied to the fourth terminal.

DETAILED DESCRIPTION OF THE INVENTION

Figure 1:
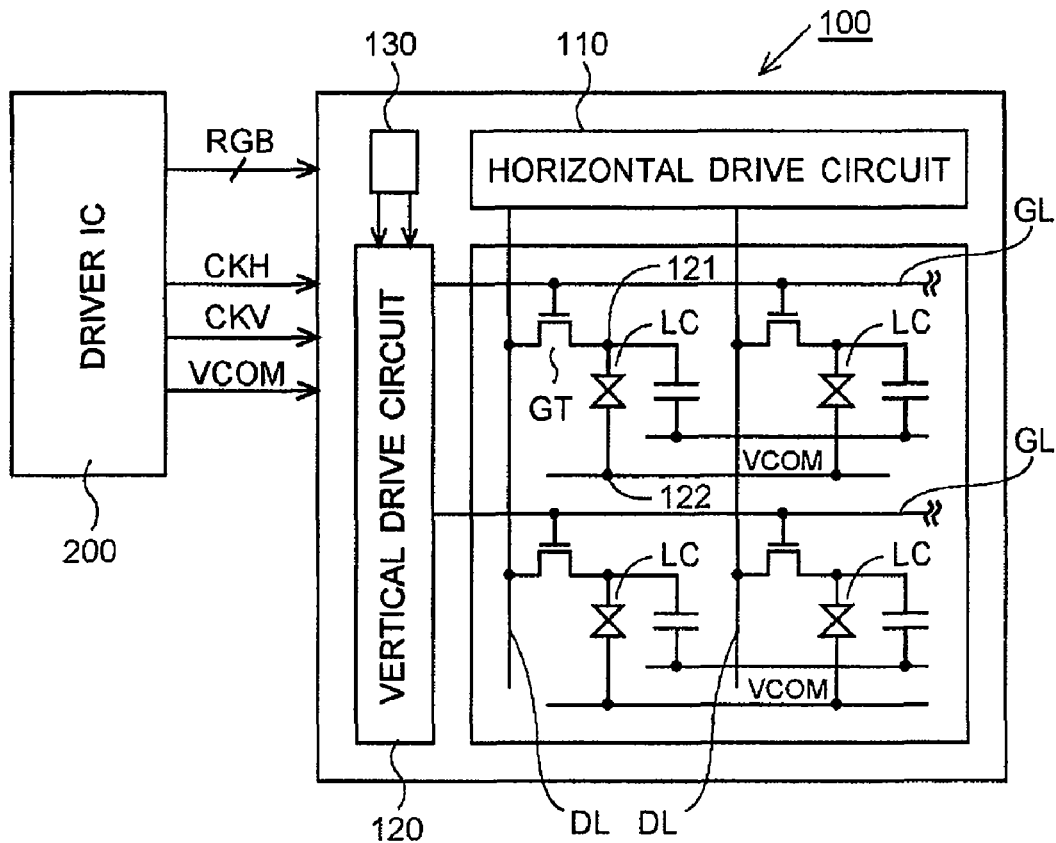
FIG. 1 is a circuit diagram showing a liquid crystal display device according to a first embodiment of this invention.

Embodiments of this invention will be described hereafter referring to the drawings.

FIG. 1 shows a liquid crystal panel 100 in a liquid crystal display device according to a first embodiment of this invention. A horizontal drive circuit 110 and a vertical drive circuit 120 are formed on a TFT substrate, and a plurality of pixels (Only four pixels are shown in FIG. 1.) is arrayed in a matrix form in a display region. The horizontal drive circuit 110 is a shift register that sequentially transfers a horizontal start signal based on a horizontal transfer clock CKH and provides each of data lines DL with video signals of RGB in response to its output. The vertical drive circuit 120 is a shift register that sequentially transfers a vertical start signal based on a vertical transfer clock CKV and provides each of gate lines GL with a gate signal in response to its output.

Figure 2:
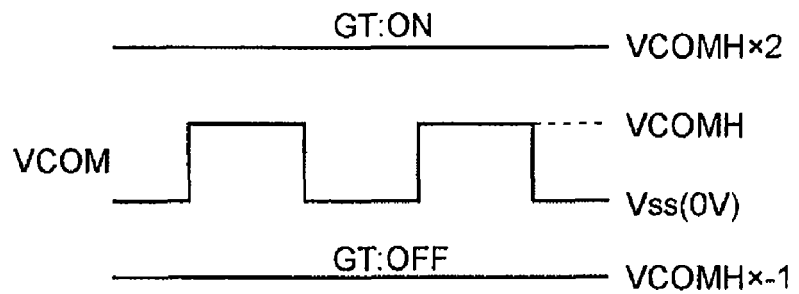
FIG. 2 is an operational waveform chart of the liquid crystal display device according to the first embodiment of this invention.

A drain of each of pixel transistors GT made of TFTs is connected with corresponding each of the data lines DL, and turning on/off of the pixel transistor GT is controlled by the gate signal. A source of each of the pixel transistors GT is connected with corresponding each of pixel electrodes 121. A counter substrate is provided facing the TFT substrate, and a common electrode 122 is formed on the counter substrate facing the pixel electrodes 121. A liquid crystal LC is sealed in between the TFT substrate and the counter substrate. A driver IC 200 disposed on the TFT substrate of the liquid crystal panel 100 or outside the liquid crystal panel 100 provides the common electrode 122 with a common electrode signal VCOM that alternates between an H level and an L level once every horizontal period for line inversion drive, as shown in FIG. 2.

Assuming that the pixel transistor GT is of N-channel type, the pixel transistor GT is turned on when the gate signal turns to the H level. As a result, the video signal is applied from the data line DL to the pixel electrode 121 through the pixel transistor GT, and liquid crystal display is performed by aligning the liquid crystal LC by an electric field induced between the common electrode 122 and the pixel electrode 121.

Since the common electrode signal VCOM alternates between the H level and the L level, an electric potential at the pixel electrode 121 is changed by capacitive coupling through the liquid crystal LC. A positive power supply electric potential of VCOMH×2, that is twice of its amplitude, is required as the H level of the gate signal to turn on the pixel transistor GT, and a negative power supply electric potential of VCOMH× (−1), that is its amplitude multiplied by minus one, is required as the L level of the gate signal to turn off the pixel transistor GT. Here, VCOMH is about 4.5V.

In order to generate the gate signal as described above, a power supply circuit 130 is formed on the TFT substrate of the liquid crystal panel 100 by SOG (System on Glass) technology so that its output is supplied to the vertical drive circuit 120. The power supply circuit 130 is composed of a DC-DC converter that generates the positive power supply electric potential and a DC-DC converter that generates the negative power supply electric potential. The common electrode signal VCOM is used as a drive signal of the DC-DC converters in the embodiments of this invention.

Figure 3:
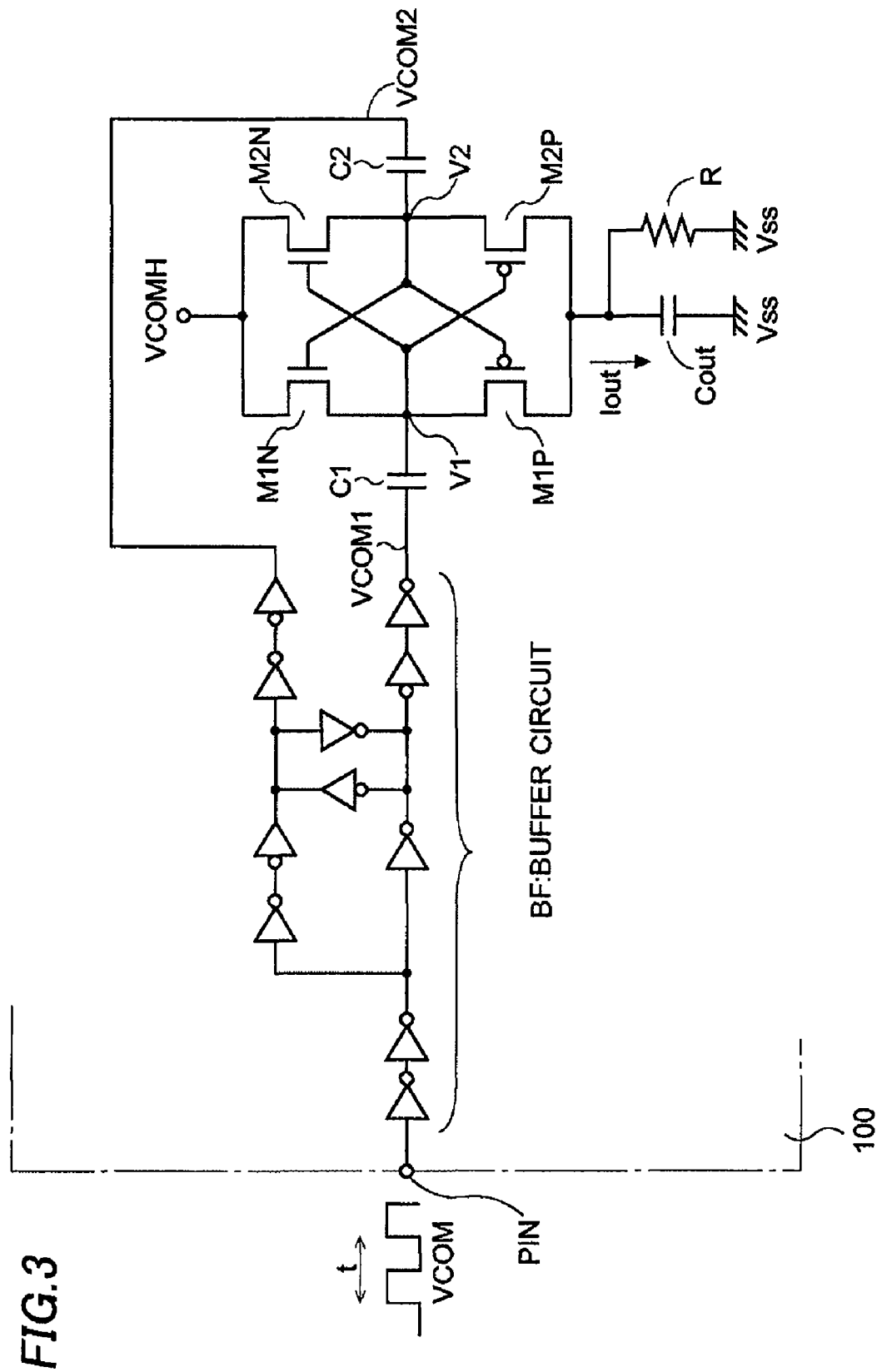
FIG. 3 is a circuit diagram of a DC-DC converter according to the first embodiment of this invention.

A circuit diagram of the DC-DC converter that generates the positive power supply electric potential is shown in FIG. 3. The common electrode signal VCOM is inputted through an input terminal PIN provided on the liquid crystal panel 100. The inputted common electrode signal VCOM is applied to one of terminals of a first flying capacitor C1 through a buffer circuit BF as a first common electrode signal VCOM1, while an inversion of the first common electrode signal VCOM1 is applied to one of terminals of a second flying capacitor C2 as a second common electrode signal VCOM2. An N-channel type charge transfer transistor M1N and a P-channel type charge transfer transistor M1P are connected in series and their gates are connected with another of the terminals of the second flying capacitor C2. An N-channel type charge transfer transistor M2N and a P-channel type charge transfer transistor M2P are connected in series and their gates are connected with another of the terminals of the first flying capacitor C1. The another of the terminals of the first flying capacitor C1 is connected with a connecting node between the charge transfer transistor M1N and the charge transfer transistor M1P, while the another of the terminals of the second flying capacitor C2 is connected with a connecting node between the charge transfer transistor M2N and the charge transfer transistor M2P.

The H level VCOMH of the common electrode signal VCOM is applied to a common source of the N-channel type charge transfer transistors M1N and M2N. When a voltage loss due to the transistors is neglected, the positive power supply electric potential VCOMH×2, that is twice of VCOMH, and an output current Iout are outputted from a common drain of the P-channel type charge transfer transistors M1P and M2P. Cout represents a smoothing capacitor and R represents a load resistance. The vertical drive circuit 120 corresponds to the load resistor R. The charge transfer transistors are formed of TFTs.

Figure 4:
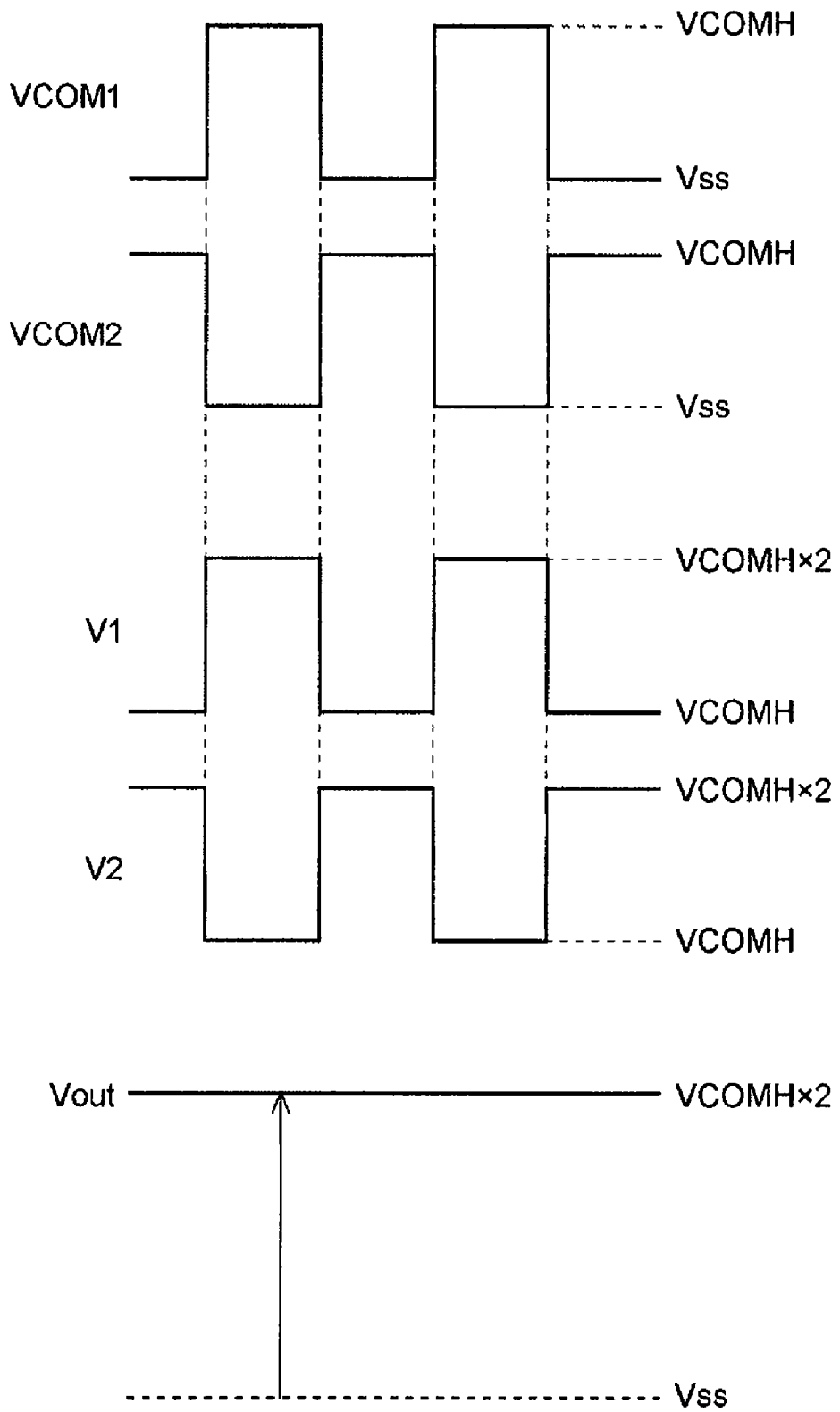
FIG. 4 is an operational waveform chart of a DC-DC converter according to the first embodiment of this invention.

Operation of the DC-DC converter in a stable state is described referring to a waveform chart shown in FIG. 4. When the first common electrode signal VCOM1 is at the H level, M1N and M2P are turned off and M2N and M1P are turned on, and an electric potential V1 at the connecting node between M1N and M1P is boosted to VCOMH×2 that is outputted through M1P. Meantime, an electric potential V2 at the connecting node between M2N and M2P is charged to VCOMH. Next, when the first common electrode signal VCOM1 turns to the L level, M1N and M2P are turned on and M2N and M1P are turned off, and the electric potential V2 is boosted to VCOMH×2 that is outputted through M2P. Meantime, the electric potential V1 is charge to VCOMH. That is, VCOMH×2 is outputted alternately from left and right serially connected transistor circuits in the DC-DC converter. Note that the voltage loss due to the transistors is neglected.

The electric potential VCOMH×2 that is suitable to turn on the pixel transistor GT can be obtained with the DC-DC converter. (It is 9.0V when VCOMH=4.5V and the voltage loss is neglected.) As a result, the triple voltage boosting required in the conventional device is no longer needed. Thus the size of the circuit can be reduced and the efficiency of the circuit can be improved. In addition, since an inversion timing (a timing of transition from the H level to the L level or a timing of transition from the L level to the H level) of the common electrode signal VCOM is within a horizontal blanking interval, the display is not adversely affected. Additional advantage is that there is less restriction on the layout, because the wiring to supply the common electrode signal VCOM is disposed all over a peripheral region of the liquid crystal panel 100, and thus the power supply circuit 130 can be provided with the common electrode signal VCOM using the wiring wherever on the TFT substrate of the liquid crystal panel 100 the power supply circuit 130 is disposed.

In the liquid crystal display device in which the common electrode 122 is formed on the counter substrate to face the pixel electrode 121 as described above, when the first and second flying capacitors C1 and C2 are formed on the liquid crystal panel 100, reduction in efficiency due to capacitance division can be prevented since a variation in an electric potential at the first flying capacitor C1 and a variation in an electric potential at the common electrode on the counter substrate become the same electric potential as the common electrode signal VCOM. On the other hand, in the case of a liquid crystal display device according to a method such as FFS (Fringe-Field Switching) or IPS (In-Plane Switching), in which the pixel electrode and the common electrode are formed on the same substrate, the variation in the electric potential is not caused because there is no electrode on the counter substrate. With the structure according to the embodiment of this invention, therefore, an excellent liquid crystal display device that does not cause the reduction in the efficiency can be realized in a liquid crystal display device of any method.

Figure 5:
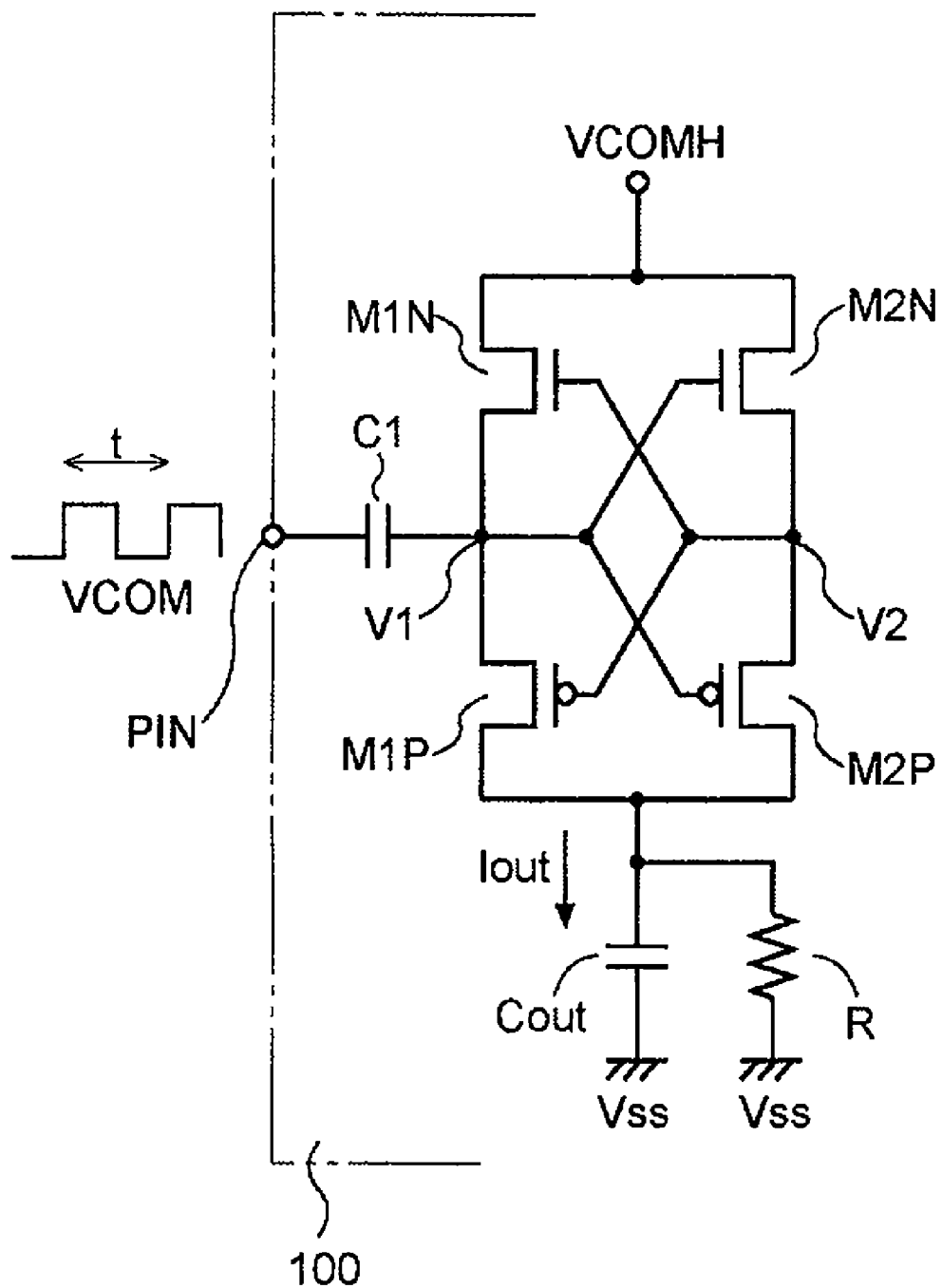
FIG. 5 is a circuit diagram of a DC-DC converter according to a second embodiment of this invention.

FIG. 5 is a circuit diagram of a DC-DC converter that generates a positive power supply electric potential, according to a second embodiment of this invention. The buffer circuit BF is removed in the DC-DC converter according to the second embodiment because of a high driving capability of an amplifier in the driver IC 200 that outputs the common electrode signal VCOM. With this, an area of the DC-DC converter can be reduced and an efficiency of the DC-DC converter can be improved. Also, the second flying capacitor C2 is removed, and the common electrode signal VCOM is applied only to the first flying capacitor C1.

Operation of the DC-DC converter in a stable state is described. When the common electrode signal VCOM is at the H level, M1N and M2P are turned off and M2N and M1P are turned on, and an electric potential V1 at a connecting node between M1N and M1P is boosted to VCOMH×2 that is outputted through M1P. Meantime, an electric potential V2 at a connecting node between M2N and M2P is charged to VCOMH. Next, when the common electrode signal VCOM turns to the L level, M1N and M2P are turned on and M2N and M1P are turned off. With M2P turned on, the electric potential V2 is charged to VCOMH×2 by charge transfer from an output side. With the DC-DC converter according to the second embodiment, therefore, the boosting operation is performed only when the common electrode signal VCOM is at the H level.

With the DC-DC converter according to the second embodiment, the area of the circuit can be further reduced and the efficiency of the circuit can be improved. Also, in the liquid crystal display device according to the second embodiment, in which the common electrode 122 is formed facing the pixel electrode 121 on the counter substrate, the reduction in the efficiency due to the capacitance division can be further prevented compared with the liquid crystal display device according to the first embodiment, because only the first flying capacitor C1 is formed on the liquid crystal panel 100.

Other structures are the same as in the circuit according to the first embodiment, and the same effects are obtained.

Figure 6:
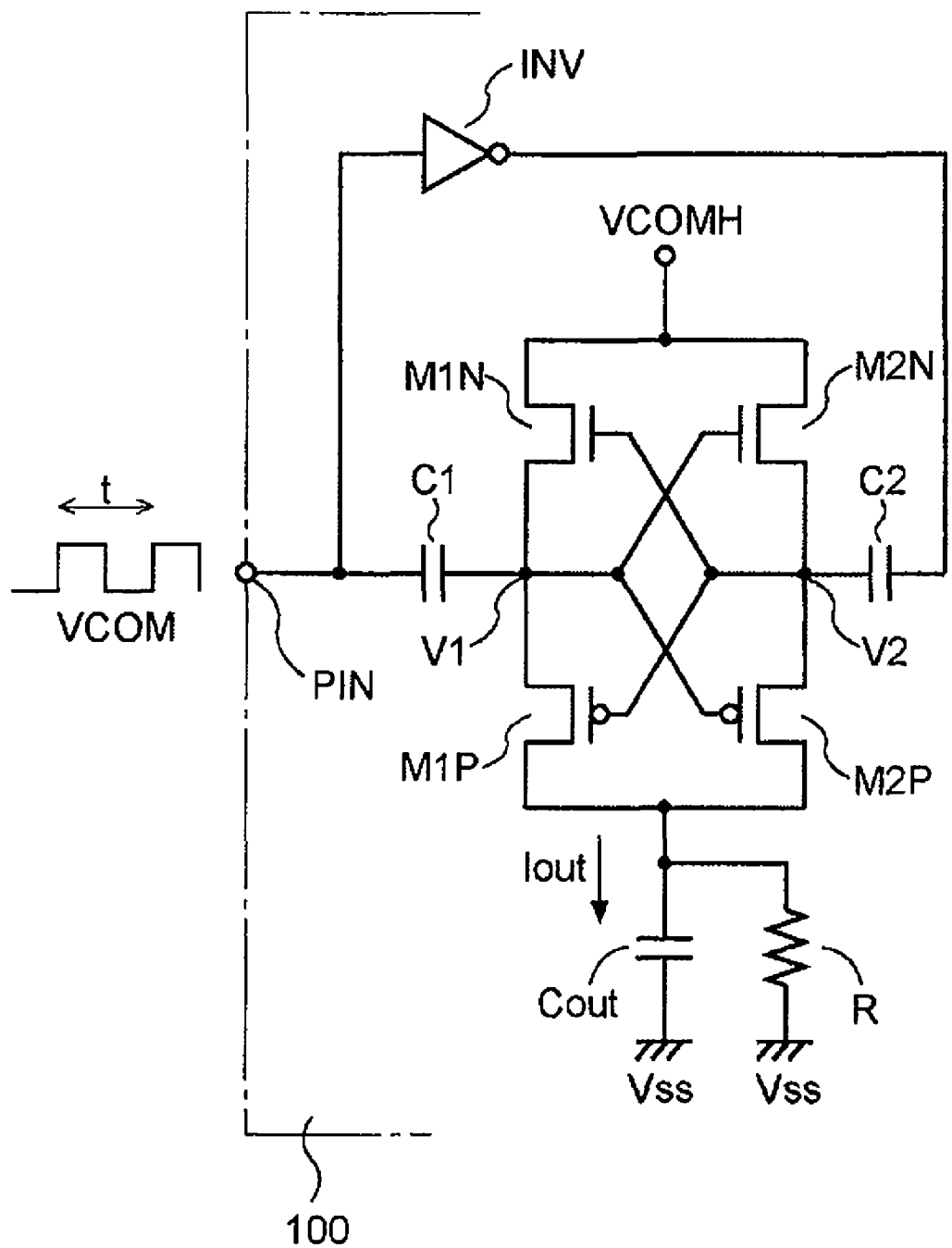
FIG. 6 is a circuit diagram of a DC-DC converter according to a third embodiment of this invention.

FIG. 6 is a circuit diagram of a DC-DC converter that generates a positive power supply electric potential according to a third embodiment of this invention. In the DC-DC converter according to the third embodiment, although the buffer BF is removed as in the DC-DC converter according to the second embodiment, there are provided a second flying capacitor C2 and an inverter INV that inverts the common electrode signal VCOM to generate an inverted common electrode signal that is applied to the second flying capacitor C2. Here, it is preferable that a capacitance of the second flying capacitor C2 is smaller than a capacitance of the first flying capacitor C1. Other structures are the same as in the circuit according to the second embodiment, and the same effects are obtained.

Figure 7:
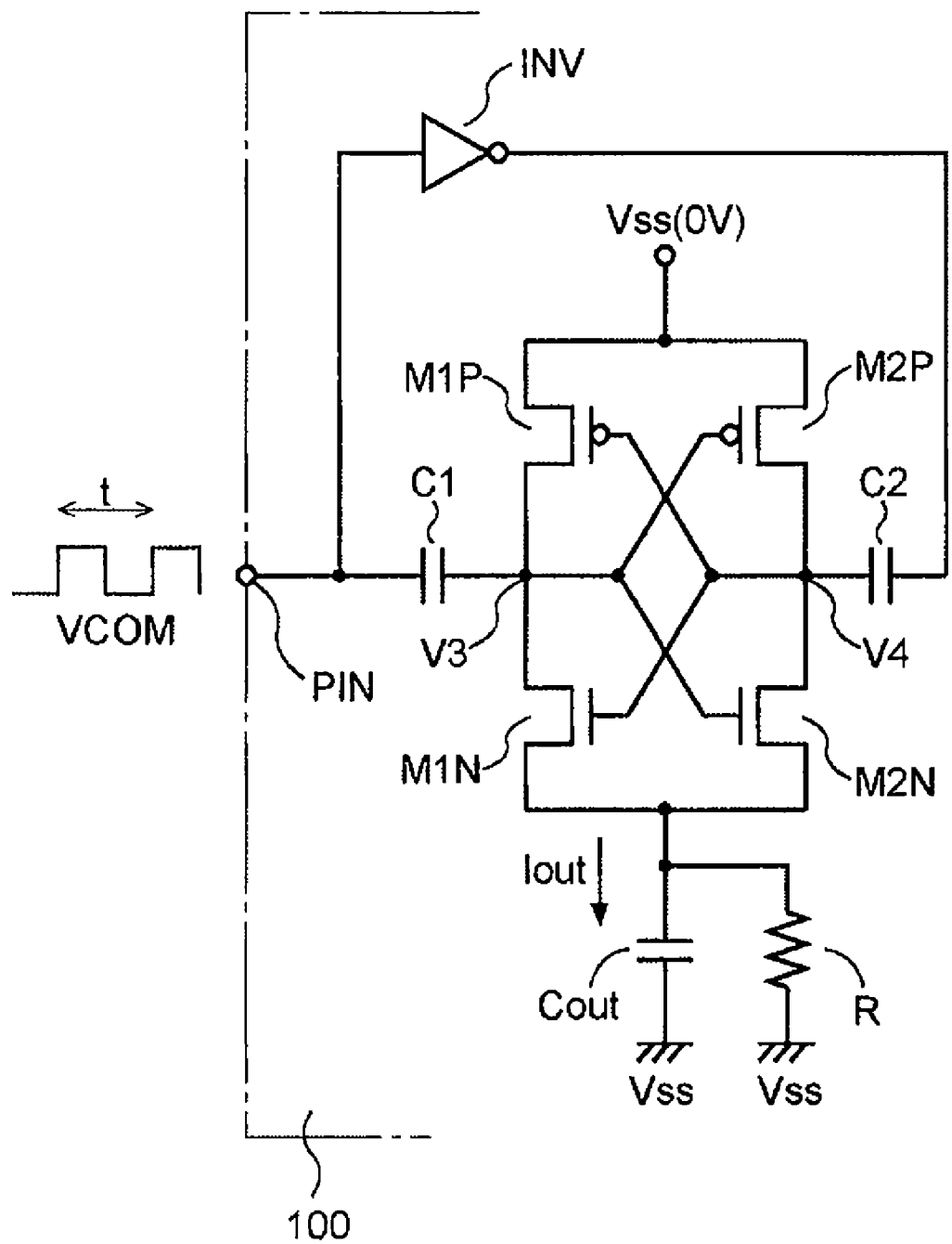
FIG. 7 is a circuit diagram of a DC-DC converter according to a fourth embodiment of this invention.

The DC-DC converter that generates the positive power supply electric potential is shown in each of the first through third embodiments. A DC-DC converter according to a fourth embodiment of this invention generates a negative power supply electric potential. In the DC-C converter according to the fourth embodiment, the common electrode signal VCOM is applied to a first flying capacitor C1 while an inverted common electrode signal is applied to a second flying capacitor C2, as shown in FIG. 7. A ground electric potential Vss (0V) is applied to a common source of M1P and M2P, and an electric potential VCOM×(−1) that is VCOM multiplied by (−1) is obtained from a common drain of M1N and M2N. With this, it is made possible to generate a gate signal suitable to turn off a pixel transistor GT. As a result, the negative double boosting required in the conventional device is no longer needed. Thus the size of the circuit can be reduced and the efficiency of the circuit can be improved. Other effects are obtained as in the devices according to the first through the third embodiments.

To describe operation of the DC-DC converter according to the fourth embodiment, when the common electrode signal VCOM is at the H level, M1N and M2P are turned off, M2N and M1P are turned on, an electric potential V3 at a connecting node between M1N and M1P is charge to Vss, and an electric potential V4 at a connecting node between M2N and M2P is lowered to the electric potential VCOM×(−1) that is outputted through M2N.

When the common electrode signal VCOM turns to the L level, M1N and M2P are turned on, M2N and M1P are turned off, and the electric potential V3 is lowered to VCOM×(−1) that is outputted through M1N. Meantime, the electric potential V4 is charge to Vss. That is, the electric potential VCOM×(−1) is outputted alternately from left and right serially connected transistor circuits in the DC-DC converter. Note that the voltage loss due to the transistors is neglected.

There will be described a CD-DC converter according to a fifth embodiment of this invention, which is the same as the first through fourth embodiments in using the common electrode signal VCOM as the dive signal of the power supply circuit 130, but is different from them in that the common electrode signal VCOM is inputted to the DC-DC converter through an input capacitor.

Figure 8:
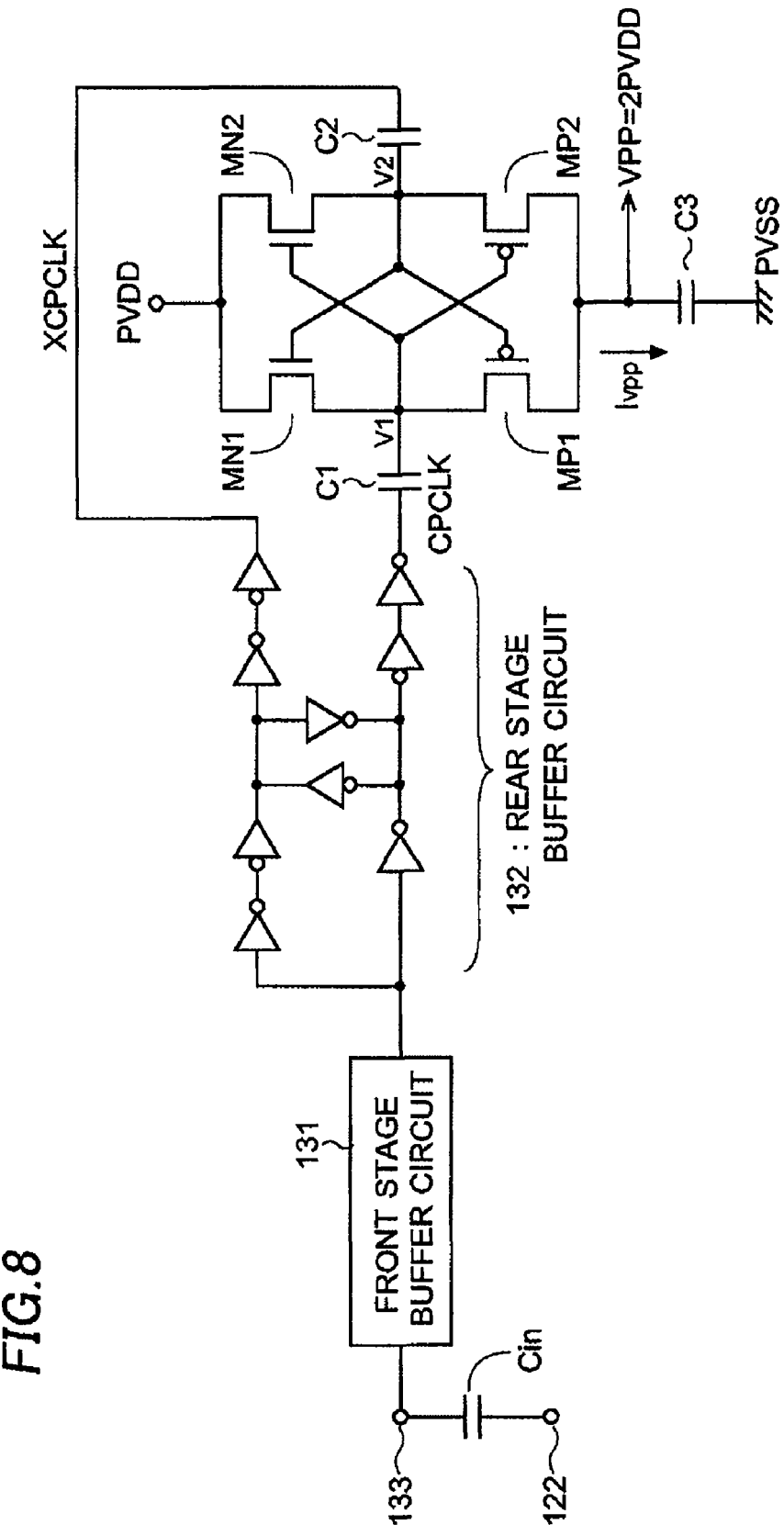
FIG. 8 is a circuit diagram of a DC-DC converter according to a fifth embodiment of this invention.

A circuit diagram of the DC-DC converter that generates the positive power supply electric potential is shown in FIG. 8. In a clock input portion of the DC-DC converter, there is provided a front stage buffer circuit 131 and a rear stage buffer circuit 132 in order to shape a waveform of a drive clock, and there is formed the input capacitor Cin between an input terminal 133 of the front stage buffer circuit 131 and a common electrode 122. The front stage buffer circuit 131 is composed of a plurality of CMOS inverters INV1, INV2 and so on connected in series.

Figure 9:
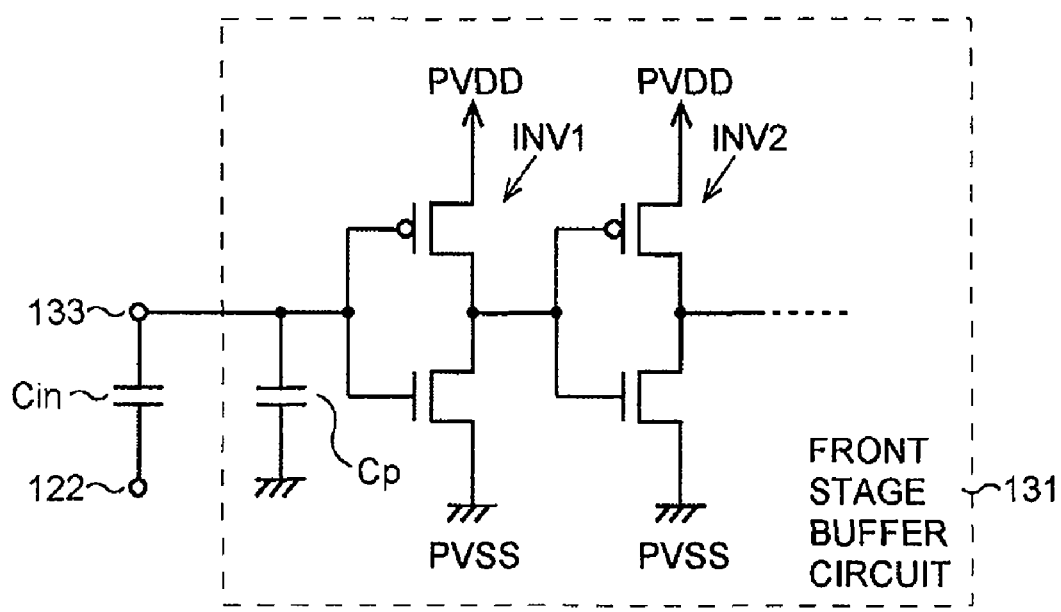
FIG. 9 is a circuit diagram of a front stage buffer circuit in the DC-DC converter according to the fifth embodiment of this invention.

The CMOS inverters INV1, INV2 and so on are composed of P-channel type transistors and N-channel type transistors, and a positive power supply electric potential PVDD is applied to a source of each of the P-channel type transistors and a ground electric potential PVSS (0V) is applied to a source of each of the N-channel type transistors, as shown in FIG. 9. The P-channel type transistors and the N-channel type transistors are made of TFTs.

Figure 10:
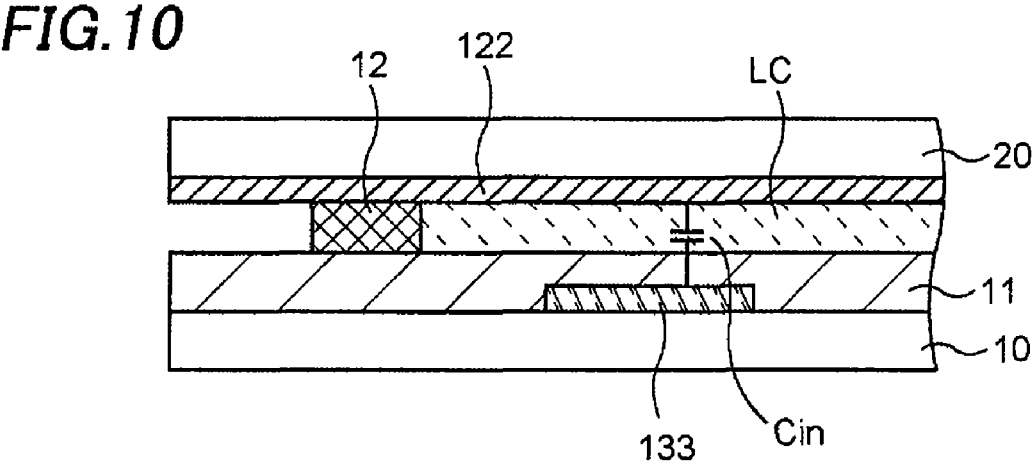
FIG. 10 is a cross-sectional view showing a structure of an input capacitor.

A structure of the input capacitor Cin is shown in FIG. 10. FIG. 10 is a partial cross-sectional view of the liquid crystal panel 100. The input terminal 133 of the front stage buffer circuit 131 is formed on a glass TFT substrate 10. The input terminal 133 is made of a layer of metal such as aluminum and covered with an insulation film 11. A glass counter substrate 20 is disposed above the glass TFT substrate 10 interposing a liquid crystal LC between them.

That is, the input capacitor Cin is composed of the input terminal 133 which makes one of capacitor electrodes, the common electrode 122 formed on the glass counter substrate 20, which makes another of the capacitor electrodes, and the insulation film 11 and the liquid crystal LC which make a capacitor insulation film. A sealing resin 12 may be interposed between the input terminal 133 and the common electrode 122 depending on a location where the power supply circuit 130 is disposed. In this case, the sealing resin 12 makes a part of the capacitor insulation film.

With the structure described above, a signal in synchronization with the common electrode signal VCOM is inputted to the input terminal 133 by capacitive coupling through the input capacitor Cin. A long wiring to supply the common electrode signal is not needed. In addition, there is less restriction on the layout since the common electrode signal VCOM can be taken out from the common electrode 122 that is formed almost all over the glass counter substrate 20. Also, an increase in the number of terminals of the liquid crystal panel can be prevented because the common electrode signal VCOM is utilized.

A first stage CMOS inverter INV1 in the front stage buffer circuit 131 has a parasitic input capacitance Cp (mainly made of gate capacitances of the P-channel type transistor and the N-channel type transistor). As a result, the signal inputted to the input terminal 133 is attenuated by capacitance division between the parasitic input capacitance Cp and a capacitance of the input capacitor Cin.

Therefore, it is preferable that the capacitance of the input capacitor Cin is sufficiently larger than the parasitic input capacitance Cp. For example, when a size W/L of the transistor is 20 μm/6 μm, it is preferable that the capacitance of the input capacitor Cin is set to be large than 0.5 pF. In order to increase the capacitance of the input capacitor Cin, a horizontal pattern size of the input terminal 133 should be designed large.

The drive clock in synchronization with the common electrode signal VCOM inputted to the input terminal 133 is inputted to one of terminals of the first flying capacitor C1 as a first drive clock CPCLK through the front stage buffer circuit 131 and the rear stage buffer circuit 132, while an inversion of the first drive clock CPCLK is inputted to one of terminals of the second flying capacitor C2 as a second drive clock XCPCLK.

The first drive clock CPCLK and the second drive clock XCPCLK are opposite in phase to each other and both have an amplitude of PVDD.

In a charge pump, an N-channel type charge transfer transistor MN1 and a P-channel type charge transfer transistor MP1 are connected in series and their gates are connected with another of the terminals of the second flying capacitor C2. An N-channel type charge transfer transistor MN2 and a P-channel type charge transfer transistor MP2 are connected in series and their gates are connected with another of the terminals of the first flying capacitor C1. The another of the terminals of the first flying capacitor C1 is connected with a connecting node between the charge transfer transistor MN1 and the charge transfer transistor MP1, while the another of the terminals of the second flying capacitor C2 is connected with a connecting node between the charge transfer transistor MN2 and the charge transfer transistor MP2.

The power supply electric potential PVDD is applied to a common source of the N-channel type charge transfer transistors MN1 and MN2. When a voltage loss due to the transistors is neglected, the positive power supply electric potential 2PVDD, that is twice of PVDD is outputted as an output voltage VPP, as well as an output current IVPP, from a common drain of the P-channel type charge transfer transistors MP1 and MP2. A smoothing capacitor C3 is connected with the common drain of the P-channel type charge transfer transistors MP1 and MP2. The charge transfer transistors are formed of TFTs.

Figure 11:
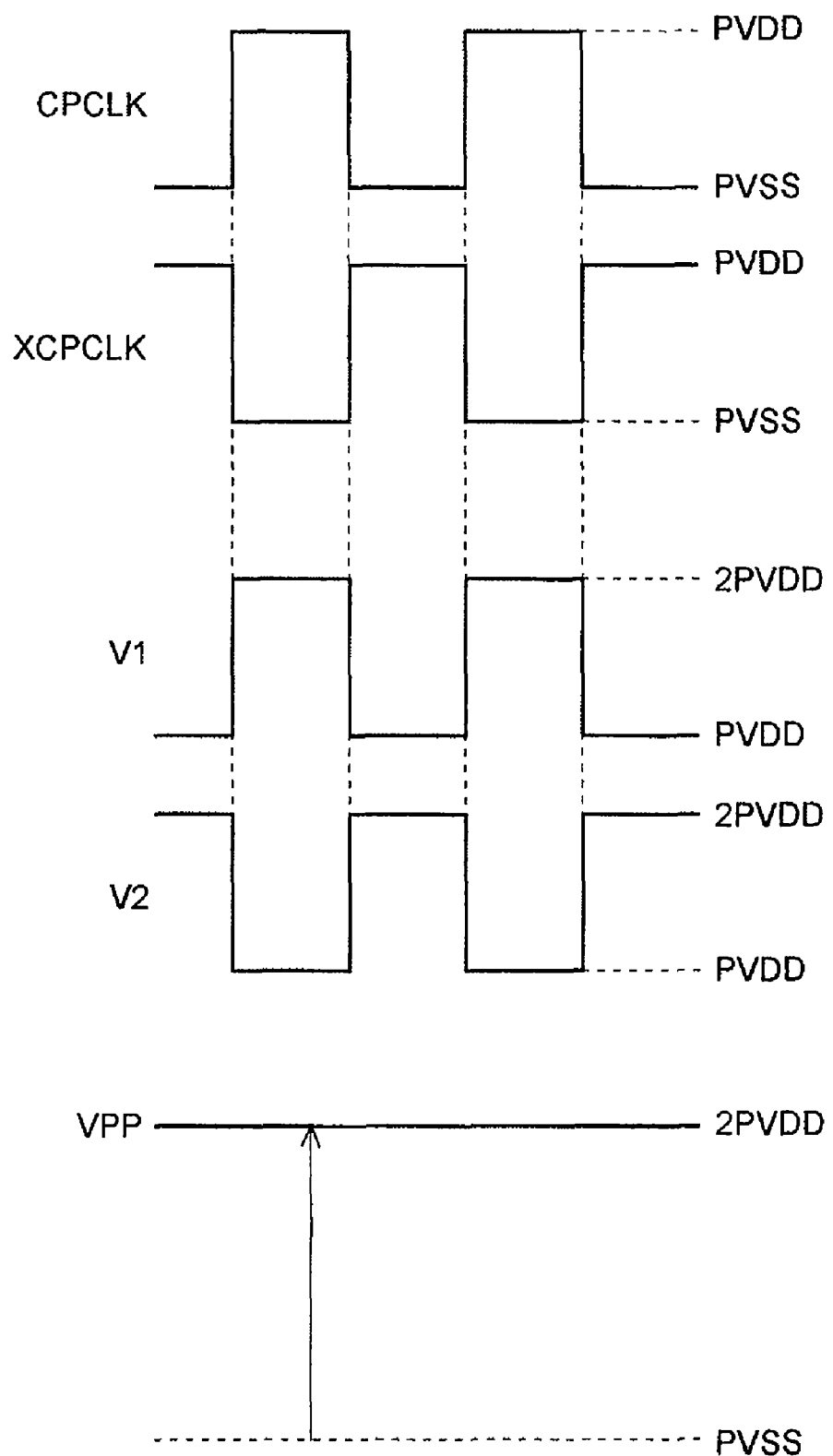
FIG. 11 is a waveform chart showing operation of the DC-DC converter according to the fifth embodiment of this invention.

Operation of the DC-DC converter in a stable state is described referring to a waveform chart shown in FIG. 11. When the first drive clock CPCLK is at an H level (PVDD), MN1 and MP2 are turned off, MN2 and MP1 are turned on, and an electric potential V1 at the connecting node between MN1 and MP1 is boosted by capacitive coupling through the first flying capacitor C1 to 2PVDD that is outputted through MP1. Meantime, an electric potential V2 at the connecting node between MN2 and MP2 is charge to PVDD.

Next, when the first drive clock CPCLK falls to an L level (PVSS), MN1 and MP2 are turned on, MN2 and MP1 are turned off, and the electric potential V2 is boosted by capacitive coupling through the second flying capacitor C2 to 2PVDD that is outputted through MP2. Meantime, the electric potential V1 is charge to PVDD. That is, 2PVDD is outputted alternately from left and right serially connected transistor circuits in the DC-DC converter. Note that the voltage loss due to the transistors is neglected.

Figure 12:
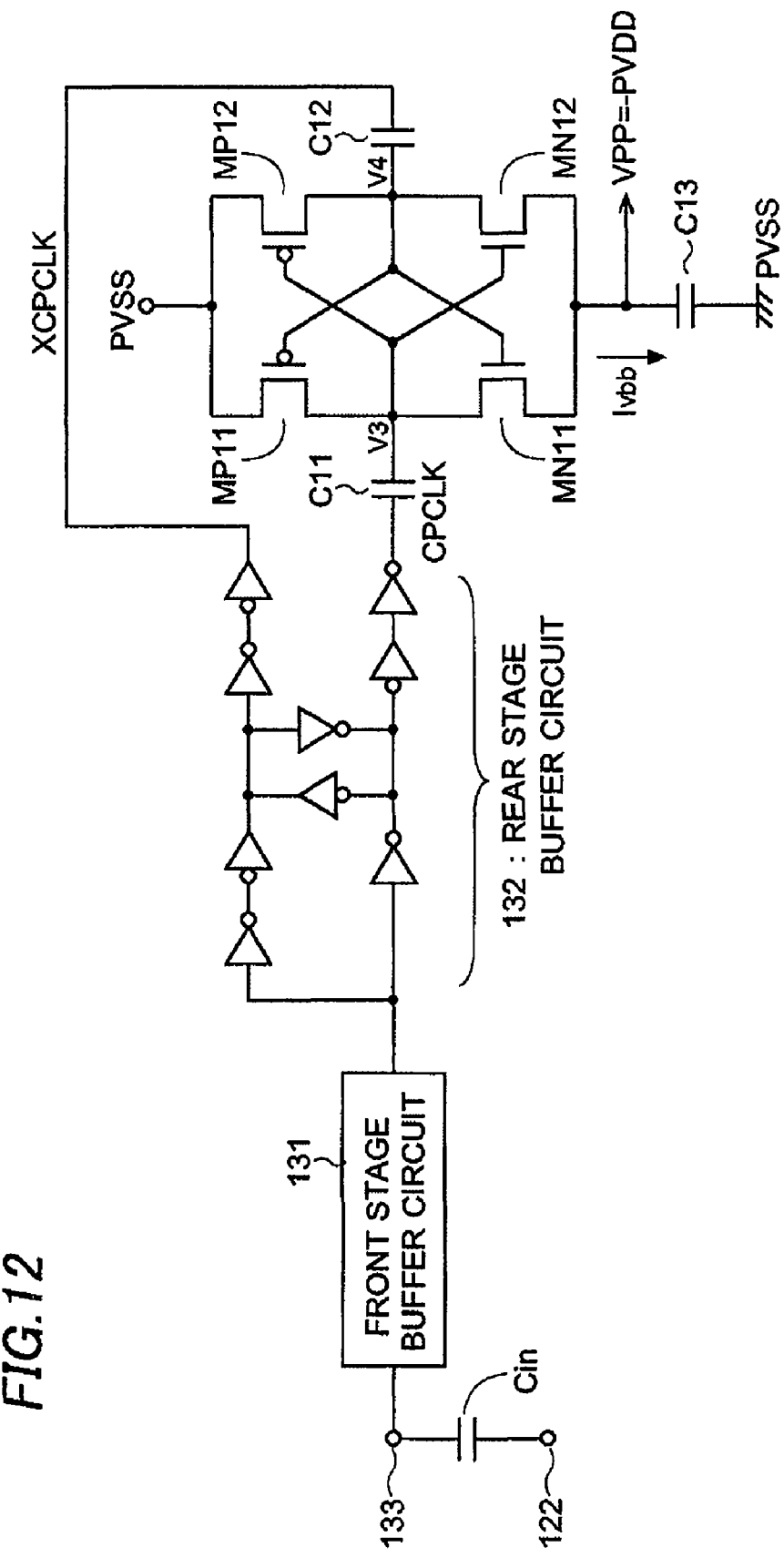
FIG. 12 is a circuit diagram of a DC-DC converter according to a sixth embodiment of this invention.

Next, a DC-DC converter according to a sixth embodiment of this invention, which generates a negative power supply electric potential and uses the input capacitor Cin will be described. In the DC-DC converter according to the sixth embodiment shown in FIG. 12, the drive clock synchronized with the common electrode signal VCOM inputted to the input terminal 133 is obtained and similar effects are realized, as in the DC-DC converter according to the fifth embodiment. The drive clock goes through the front stage buffer circuit 131 and the rear stage buffer circuit 132 and inputted to one of terminals of a first flying capacitor C11 as the first drive clock CPCLK, while the second drive clock SCPCLK is inputted to one of terminals of a second flying capacitor C12.

An N-channel type charge transfer transistor MN11 and a P-channel type charge transfer transistor MP11 are connected in series in a charge pump. The DC-DC converter according to the sixth embodiment is different from the DC-DC converter according to the fifth embodiment in that the ground electric potential PVSS is applied to a common source of MP11 and MP12, and an electric potential −PVDD that is PVDD multiplied by (−1) is obtained from a common drain of MN11 and MN12. A smoothing capacitor C13 is connected with the common drain of MN11 and MN12.

Figure 13:
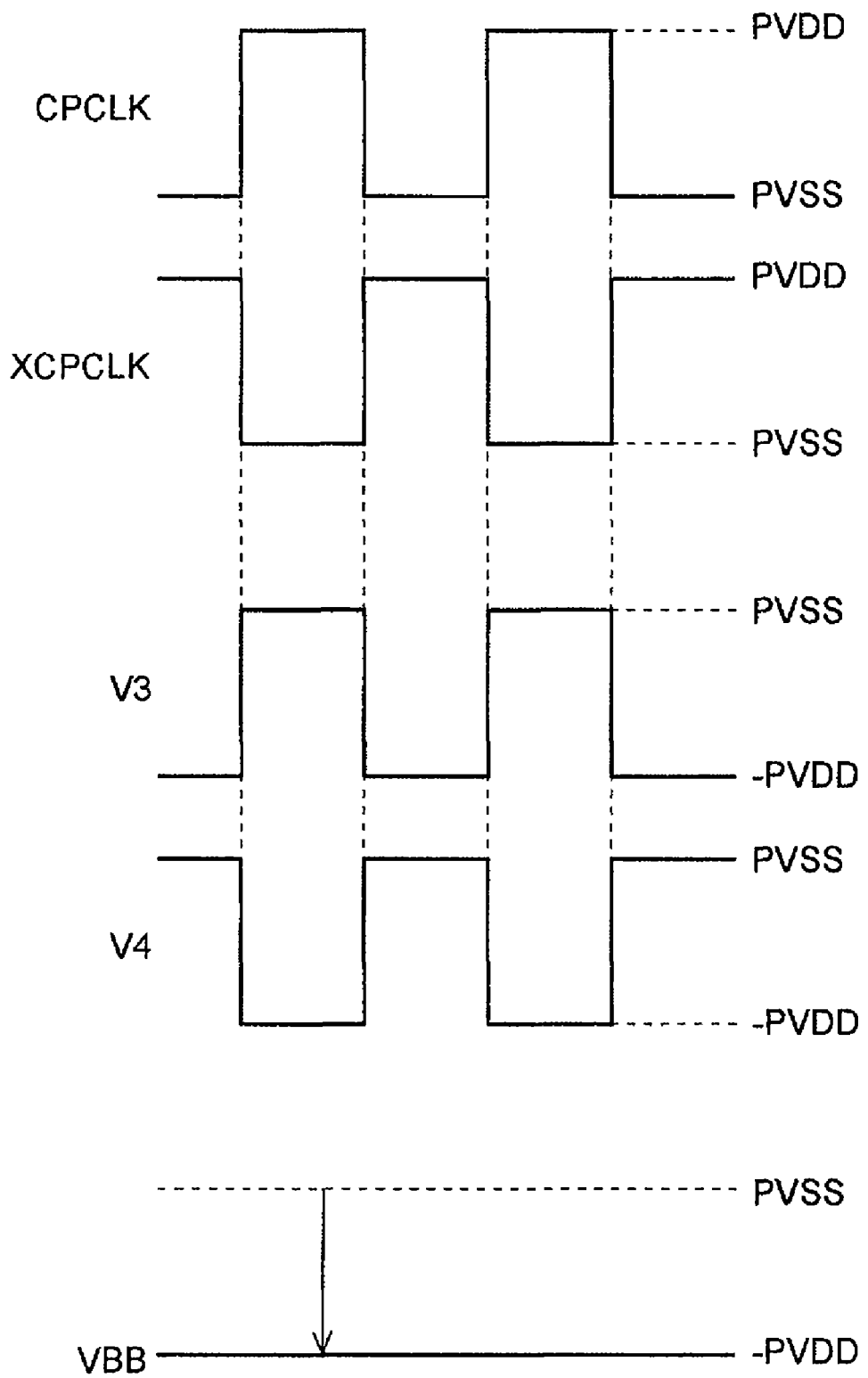
FIG. 13 is a waveform chart showing operation of the DC-DC converter according to the sixth embodiment of this invention.

To describe operation of the DC-DC converter according to the sixth embodiment referring to FIG. 13, when the first drive clock CPCLK is at the H level (PVDD), MN11 and MP12 are turned off, MN12 and MP11 are turned on, an electric potential V3 at a connecting node between MN11 and MP11 is charge to PVSS, and an electric potential V4 at a connecting node between MN12 and MP12 is lowered to −PVDD that is outputted through MN12.

When the first drive clock CPCLK turns to the L level (PVSS), MN11 and MP12 are turned on, MN12 and MP11 are turned off, and the electric potential V3 is lowered to −PVDD that is outputted through MN11. Meantime, the electric potential V4 is charge to PVSS. That is, the electric potential −PVDD is outputted alternately from left and right serially connected transistor circuits in the DC-DC converter.

The DC-DC converter is not limited to the circuits described in the embodiments, and a circuit modified from the embodiment or a different type of circuit may be used as long as the circuit converts the inputted electric potential and outputs the converted electric potential using the flying capacitor and the charge transfer device. Also, the front stage buffer circuit 131 and the rear stage buffer circuit 132 are not limited to those described in the embodiment, and may be a circuit modified from the embodiment or another type of buffer circuit. Also, the buffer circuit may be shared by the DC-DC converter that generates the positive electric potential and the DC-DC converter that generates the negative electric potential.

With the liquid crystal display device according to the embodiments of this invention, the +2 times boosting and the −1 time boosting are good enough and the size of the power supply circuit can be reduced, since the common electrode signal is used as the drive signal of the power supply circuit. And since the driving capability of the amplifier that outputs the common electrode signal is large, providing the buffer circuit is no longer needed and it is made possible that the area of the circuit is reduced and the efficiency of the circuit is improved. Additional benefit is that the display is not adversely affected, since the inversion timing (the timing of transition from the H level to the L level or the timing of transition from the L level to the H level) of the common electrode signal VCOM is within the horizontal blanking interval. Further advantage is that there is less restriction on the layout, because the wiring to supply the common electrode signal is disposed all over the peripheral region of the panel, and thus the power supply circuit can be provided with the common electrode signal using the wiring wherever on the panel the power supply circuit is disposed.

Also, with the liquid crystal display device according to the embodiments of this invention, the restrictions on the layout of the wiring for the drive clock can be reduced and the increase in the area of the frame region and the number of the terminals of the liquid crystal panel can be prevented, since the power supply circuit is provided with the common electrode signal as the drive clock using the capacitive coupling through the input capacitor.

With the poser supply circuit according to the embodiments of this invention, the restrictions on layout of the wiring for the drive clock can be reduced and increase in the area of the circuit can be prevented, since the power supply circuit is provided with the drive clock using the capacitive coupling through the capacitor.

What is claimed is:

1. A liquid crystal display device comprising:
a switching device;
a pixel electrode to which a video signal is applied through the switching device;
a common electrode to which a common electrode signal is applied, the common electrode signal alternating between a high level and a low level;
a liquid crystal that is aligned by an electric field between the pixel electrode and the common electrode; and
a power supply circuit that generates a power supply electric potential to control turning on and off of the switching device, the power supply circuit comprising first and second charge transfer devices that complementarily turn on and off to each other in response to the common electrode signal and a first capacitor having one terminal connected with a connecting node between the first and second charge transfer devices and another terminal to which the common electrode signal is applied; wherein the power supply circuit further comprises third and fourth charge transfer devices that complementarily turn on and off to each other in response to the common electrode signal and a second capacitor having one terminal connected with a connecting node between the third and fourth charge transfer devices and another terminal to which an inverted signal of the common electrode signal is applied.

2. The liquid crystal display device of claim 1, the power supply circuit further comprising a buffer circuit, wherein the common electrode signal is provided to the first and second capacitors through the buffer circuit.

3. A liquid crystal display device comprising:
a first substrate;
a switching device formed on the first substrate;
a pixel electrode to which a video signal is applied through the switching device formed on the first substrate;
a second substrate disposed to face the first substrate;
a common electrode formed on the second substrate, a common electrode signal being applied to the common electrode, the common electrode signal alternating between a high level and a low level;
a liquid crystal that is aligned by an electric field between the pixel electrode and the common electrode; and
a power supply circuit that generates a power supply electric potential to control turning on and off of the switching device, the power supply circuit comprising first and second charge transfer devices, a capacitor having a first terminal connected with a connecting node between
the first and second charge transfer devices and a second terminal, a buffer circuit having an input terminal and an output terminal connected with the second terminal of the capacitor and an input capacitor formed between the input terminal of buffer circuit and the common electrode; wherein the buffer circuit comprises a plurality of inverters connected in series and the input capacitor is formed between an input terminal of a first stage inverter of the plurality of inverters and the common electrode.

4. The liquid crystal display device of claim 3, wherein a capacitance of the input capacitor is larger than a capacitance of a parasitic input capacitor of the first stage inverter.

* * * * *